(12) United States Patent
Sugiura et al.

(10) Patent No.: US 8,872,948 B2
(45) Date of Patent: Oct. 28, 2014

(54) SOLID-STATE IMAGING DEVICE WHICH SETS A BLACK LEVEL REFERENCE WHEN CAPTURING AN IMAGE

(75) Inventors: Kazuhide Sugiura, Kanagawa (JP); Hiroyasu Kunimi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 333 days.

(21) Appl. No.: 13/422,176

(22) Filed: Mar. 16, 2012

(65) Prior Publication Data

US 2013/0027592 A1 Jan. 31, 2013

(30) Foreign Application Priority Data

Jul. 26, 2011 (JP) ................................. 2011-163451

(51) Int. Cl.
*H04N 9/64* (2006.01)
*H04N 5/378* (2011.01)
*H04N 5/361* (2011.01)

(52) U.S. Cl.
CPC .............. *H04N 5/361* (2013.01); *H04N 5/378* (2013.01)
USPC ........................................................ 348/243

(58) Field of Classification Search
USPC ........................................................ 348/243
See application file for complete search history.

(56) References Cited

U.S. PATENT DOCUMENTS

| 8,537,254 | B2 * | 9/2013 | Miyashita et al. ............ 348/255 |
| 2005/0248665 | A1 | 11/2005 | Morishita |
| 2011/0074986 | A1 * | 3/2011 | Ogata ........................... 348/243 |
| 2012/0147210 | A1 * | 6/2012 | Miyashita et al. .......... 348/223.1 |

FOREIGN PATENT DOCUMENTS

| JP | 2005-303648 | 10/2005 |
| JP | 2005-323041 | 11/2005 |
| JP | 2008-54256 | 3/2008 |
| JP | 2010-56707 | 3/2010 |

* cited by examiner

*Primary Examiner* — Gary C Vieaux
(74) *Attorney, Agent, or Firm* — Oblon, Spivak, McClelland, Maier & Neustadt, L.L.P.

(57) ABSTRACT

According to one embodiment, a solid-state imaging device includes an effective pixel portion in which effective pixels are provided, a light-shielded pixel portion in which light-shielded pixels are provided, an ADC circuit that performs an AD conversion operation for signal components read from the effective pixel and the light-shielded pixel, on the basis of a result of a comparison with a reference voltage on which a clamping voltage is superimposed, and an AD clamping circuit that calculates a clamping voltage for a target value of a black level read from the light-shielded pixel by extrapolating a relation between the clamping voltage and an AD-converted value of the black level read from the light-shielded pixel at the time when the clamping voltage is applied.

18 Claims, 3 Drawing Sheets

SOLID-STATE IMAGING DEVICE WHICH SETS A BLACK LEVEL REFERENCE WHEN CAPTURING AN IMAGE

CROSS-REFERENCE TO RELATED APPLICATIONS

This application is based upon and claims the benefit of priority from Japanese Patent Application No. 2011-163451, filed on Jul. 26, 2011; the entire contents of which are incorporated herein by reference.

FIELD

Embodiments described herein relate generally to a solid-state imaging device.

BACKGROUND

Among solid-state imaging devices, there is a type in which an OB (optical black) pixel is provided to set a black level reference when capturing an image. A dark voltage of the OB pixel changes according to usage conditions such as a high temperature, or high sensitivity. Accordingly, the black level read from the OB pixel fluctuates. In order to compensate the fluctuation of the black level, there is a case in which a clamping voltage at the time of performing an AD conversion operation for a pixel signal is controlled in a feedback manner until the black level read from the OB pixel converges on a target value. In such a feedback control, there is a large variation in the time taken for the black level to converge on the target value, and accordingly the black level occasionally failed to converge on the target value within the time defined with the frame rate.

DETAILED DESCRIPTION

A solid-state imaging device according to an embodiment includes an effective pixel portion, a light-shielded pixel portion, a column ADC circuit, and an AD clamping circuit. The effective pixel portion is provided with effective pixels. The light-shielded pixel portion is provided with light-shielded pixels. The ADC circuit performs an AD conversion operation for signal components read from the effective pixel and the light-shielded pixel on the basis of a result of a comparison with a reference voltage on which the clamping voltage is superimposed. The AD clamping circuit calculates a clamping voltage for a target value of a black level read from the light-shielded pixel by extrapolating the relation between an analog-to-digital converted value of the black level read from the light-shielded pixel when a clamping voltage is applied, and the clamping voltage.

Hereafter, the solid-state imaging device according to the embodiment is described with reference to the drawings. The present invention is not limited by these embodiments.
(First Embodiment)

Figure 1:
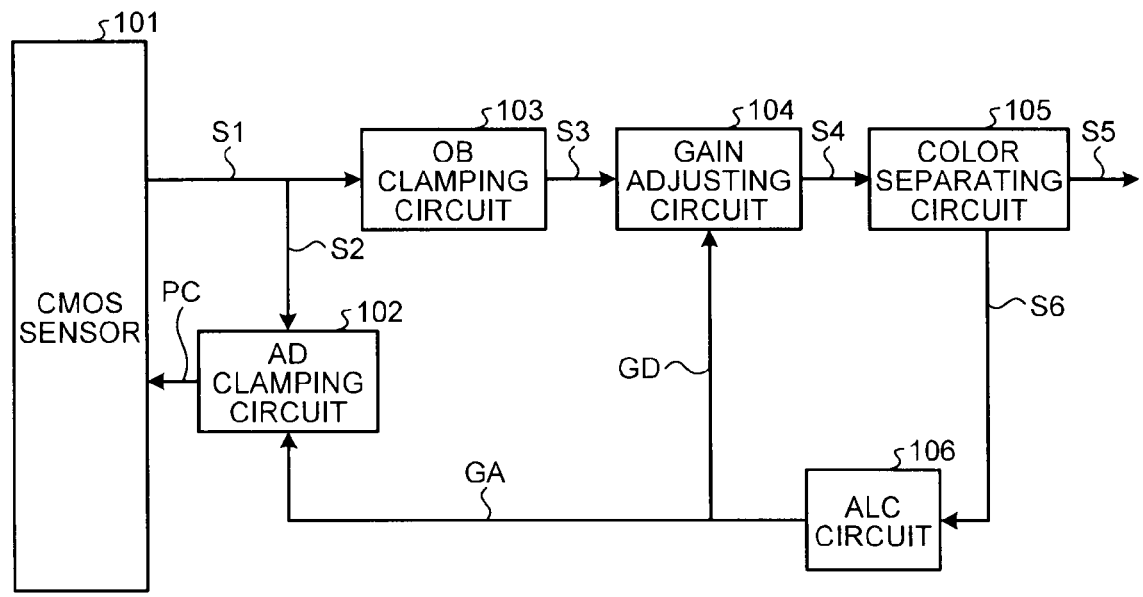
FIG. 1 is a block diagram illustrating a schematic configuration of a solid-state imaging device according to an embodiment.

FIG. 1 is a block diagram illustrating a schematic configuration of a solid-state imaging device according to an embodiment.

The solid-state imaging device illustrated in FIG. 1 is provided with a CMOS sensor 101 that outputs an image signal S1, an AD clamping circuit 102, an OB clamping circuit 103, a gain adjusting circuit 104, a color separating circuit 105, and an automatic level controlling circuit 106. The filter arrangement of the CMOS sensor 101 may be the Bayer arrangement, for example, and an example of the image signal S1 is a RAW image signal.

The CMOS sensor 101 is further provided with an OB pixel that is used to set a black level reference when capturing an image and an effective pixel that outputs the image signal S1 on the basis of a photoelectric conversion. Moreover, the CMOS sensor 101 can perform an AD conversion operation for a signal component read from the effective pixel on the basis of a result of a comparison with a reference voltage on which a clamping voltage is superimposed. The reference voltage can be time-divisionally switched between a clamping voltage generation period and a ramp wave generation period.

The AD clamping circuit 102 can set a control parameter PC such that the black level read from the OB pixel of the CMOS sensor 101 is matched with the target value. The black level read from the OB pixel can be adjusted using the control parameter PC. Here, the AD clamping circuit 102 can calculate a clamping voltage for the target value of the black level read from the OB pixel, by extrapolating the relation between the analog-to-digital converted value of the black level read from the OB pixel when a predetermined clamping voltage is applied, and the clamping voltage. Moreover, a relation between the analog-to-digital converted value of the black level read from the OB pixel and the clamping voltage can be given by a linear function.

The OB clamping circuit 103 can clamp an image signal read from the effective pixel on the basis of the black level read from the OB pixel of the CMOS sensor 101.

The gain adjusting circuit 104 can adjust a white balance and a gain of an image signal S3 output from the OB clamping circuit 103. The parameters used to adjust the white balance and the gain may be a command setting value and a digital gain GD.

The color separating circuit 105 can convert an image signal S4 output from the gain adjusting circuit 104 into a color separation signal S5. Examples of the color separation signal S5 include an RGB signal and a YUV signal. For this case, the color separating circuit 105 can extract a brightness signal S6 from the image signal S4.

The automatic level controlling circuit 106 can adjust a brightness of a screen. For this case, the automatic level controlling circuit 106 determines the brightness of the screen on the basis of the brightness signal S6 and can adjust a digital gain GD and an analog gain GA.

In the CMOS sensor 101, incident light from a subject is photoelectrically converted. Subsequently, the image signal S1 generated by the CMOS sensor 101 is output to the OB clamping circuit 103. Moreover, an OB signal S2 read from the OB pixel of the CMOS sensor 101 is output to the AD clamping circuit 102.

In the OB clamping circuit 103, the image signal S3 is generated by an operation of clamping the image signal S1 on the basis of the black level read from the OB pixel, and is output to the gain adjusting circuit 104.

In the gain adjusting circuit 104, the image signal S4 is generated by an operation of adjusting the gain of the image signal S3 on the basis of the digital gain GD output from the automatic level controlling circuit 106, and is output to the color separating circuit 105.

In the color separating circuit 105, the image signal S4 is converted into the color separation signal S5, and the brightness signal S6 is extracted from the image signal S4. The brightness signal S6 is output to the automatic level controlling circuit 106.

In the automatic level controlling circuit 106, the digital gain GD and the analog gain GA are adjusted on the basis of the brightness signal S6, the digital gain GD is output to the gain adjusting circuit 104, and the analog gain GA is output to the AD clamping circuit 102.

In the AD clamping circuit 102, during the clamping voltage generation period, the control parameter PC is set such that a predetermined clamping voltage is applied and is output to the CMOS sensor 101. At this time, the analog-to-digital converted value of the black level read from the OB pixel of the CMOS sensor 101 is output to the AD clamping circuit 102 as the OB signal S2. Next, in the AD clamping circuit 102, the relation between the analog-to-digital value of the black level at that time and the clamping voltage is extrapolated to calculate the clamping voltage for the target value of the black level read from the OB pixel. The control parameter PC is set such that the clamping voltage for the target value of the black level is applied, and the control parameter PC is then output to the CMOS sensor 101.

Moreover, in the AD clamping circuit 102, during the ramp wave generation period, the control parameter PC is set such that an inclination of a ramp wave is controlled according to the analog gain GA, and the control parameter PC is output to the CMOS sensor 101. The CMOS sensor 101 performs an AD conversion operation for signal components on the basis of a count result of a clock until levels of the signal components read from the effective pixel and the light-shielded pixel are matched with a level of the ramp wave.

As a result, the AD clamping circuit 102 can calculate the clamping voltage for the target value of the black level, by acquiring, at least twice, the analog-to-digital converted value of the black level at the time when a predetermined clamping voltage is applied. For such a reason, the clamping voltage at the time of performing the AD conversion operation for a pixel signal needs not be controlled in a feedback manner until the black level read from the OB pixel converges on the target value, and a variation in the time taken for the black level to converge on the target value can be reduced. Accordingly, the black level may converge on the target value within the time defined with a frame rate.

Figure 2:
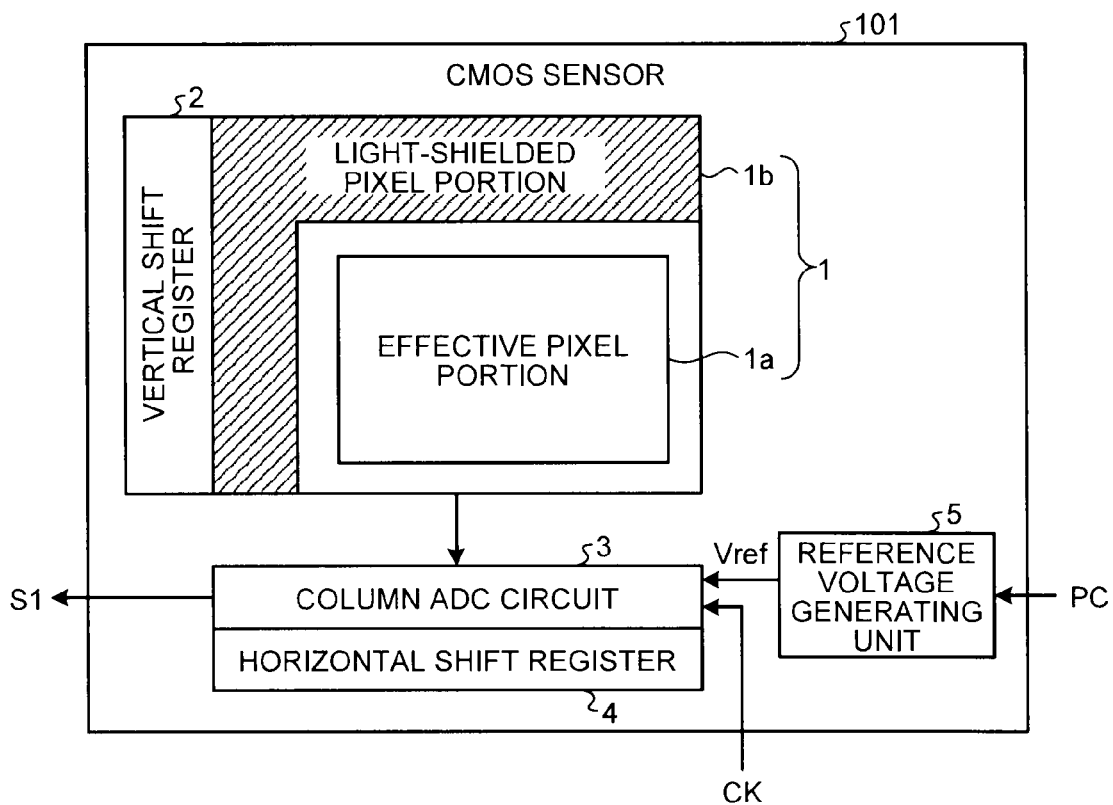
FIG. 2 is a block diagram illustrating a schematic configuration of a CMOS sensor in FIG. 1.

FIG. 2 is a block diagram illustrating a schematic configuration of the CMOS sensor of FIG. 1.

In FIG. 2, the CMOS sensor 101 is provided with a pixel array unit 1 in which pixels are arranged in a matrix form, in a direction of row and a direction of column. The pixel array unit 1 is provided with an effective pixel portion 1a, in which pixels are arranged in a matrix form in the direction of row and the direction of column, and with a light-shielded pixel portion 1b provided around the effective pixel portion 1a. Effective pixels are provided in the effective pixel portion 1a, and light-shielded pixels (OB pixels) are provided in the light-shielded pixel portion 1b.

Moreover, the CMOS sensor 101 is further provided with a vertical shift register 2 that vertically scans the pixel array unit 1, a column ADC circuit 3 that digitizes a signal component read from the pixel array unit 1 using a CDS on the basis of a result of a comparison with a reference voltage Vref, a horizontal shift register 4 that horizontally scans the pixel array unit 1, and a reference voltage generating unit 5 that generates a reference voltage Vref on the basis of the control parameter PC. The control parameter PC may be used to set a clamping level or an inclination of a reference voltage Vref. Moreover, the reference voltage Vref may be a ramp wave. Moreover, the clamping voltage may be superimposed on the reference voltage Vref.

In addition, signals are read from the pixels of the pixel array unit 1 by an operation in which the pixels of the pixel array unit 1 are scanned in a vertical direction by the vertical shift register 2, and then the read signals are transmitted to the column ADC circuit 3. In the column ADC circuit 3, signal components read from the pixel array unit 1 are digitized using the CDS. Then, a horizontal scanning is performed by the horizontal shift register 4, so that the image signal S1 is output.

Here, a counter clock CK is input to the column ADC circuit 3 during the ramp wave generation period. Next, the signal component undergoes the AD conversion operation on the basis of the count result of the counter clock CK until the level of the signal component read from the pixel array unit 1 is matched with the level of the ramp wave.

Moreover, the AD clamping circuit 102 can set the control parameter PC such that a dark current of the OB pixel is offset by the clamping level of the reference voltage Vref during an AD conversion operation performed by the column ADC circuit 3.

Figure 3:
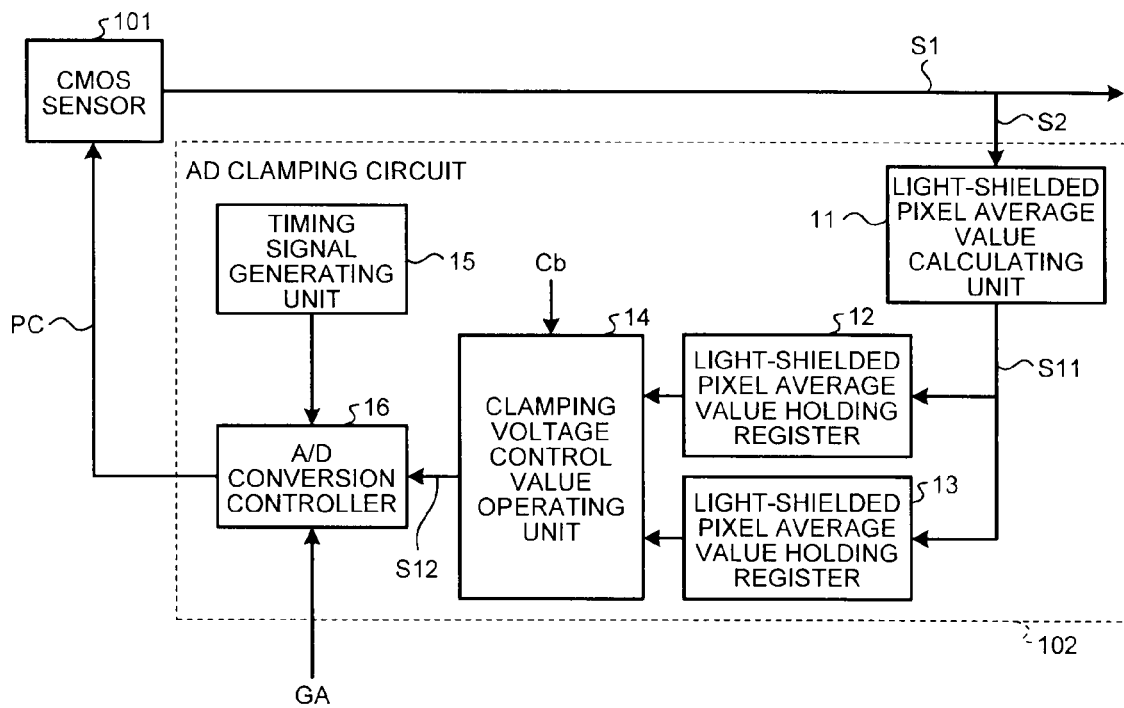
FIG. 3 is a block diagram illustrating a schematic configuration of an AD clamping circuit in FIG. 1.

FIG. 3 is a block diagram illustrating a schematic configuration of the AD clamping circuit in FIG. 1.

In FIG. 3, the AD clamping circuit 102 is provided with a pixel average value calculating unit 11, light-shielded pixel average value holding registers 12 and 13, a clamping voltage control value operating unit 14, a timing signal generating unit 15, and an A/D conversion controller 16.

When the timing signal generating unit 15 transitions to the clamping voltage generation period, the control parameter PC is set by the A/D conversion controller 16 such that a first clamping voltage is applied, and the control parameter PC is output to the CMOS sensor 101. In the CMOS sensor 101, the black level, read from the light-shielded pixel portion 1b at the time when the first clamping voltage is applied, undergoes the AD conversion operation so that the OB signal S2 is generated and input to the pixel average value calculating unit 11. In the pixel average value calculating unit 11, the OB signal S2 generated at that time is averaged for each horizontal line to calculate an HOB pixel average value S11, and the HOB pixel average value S11 is held in the light-shielded pixel average value holding register 12.

Moreover, in the A/D conversion controller 16, the control parameter PC is set such that a second clamping voltage is applied, and the control parameter PC is output to the CMOS sensor 101. In the CMOS sensor 101, the black level, read from the light-shielded pixel portion 1b at the time when the second clamping voltage is applied, undergoes the AD conversion operation so that the OB signal S2 is generated and input to the pixel average value calculating unit 11. The HOB pixel average value S11 is calculated by an operation in which the OB signal S2 at that time is averaged for each horizontal line in the pixel average value calculating unit 11, and the HOB pixel average value S11 is held in the light-shielded pixel average value holding register 13.

In the clamping voltage control value operating unit 14, on the basis of the HOB pixel average value S11 at the time when the first clamping voltage is applied and the HOB pixel average value S11 at the time when the second clamping voltage is applied, the relation between the HOB pixel average value S11 and the clamping voltage is interpolated. By this operation, the clamping voltage control value S12 for the target value Cb of the black level is calculated and output to the A/D conversion controller 16.

In the A/D conversion controller 16, the control parameter PC is set such that the clamping voltage for the target value Cb of the black level is applied on the basis of the clamping voltage control value S12, and the control parameter PC is output to the CMOS sensor 101.

On the other hand, when the timing signal generating unit 15 transitions to the ramp wave generation period, the control parameter PC is set such that the inclination of the ramp wave is controlled according to the analog gain GA, and the control parameter PC is output to the CMOS sensor 101.

Figure 4:
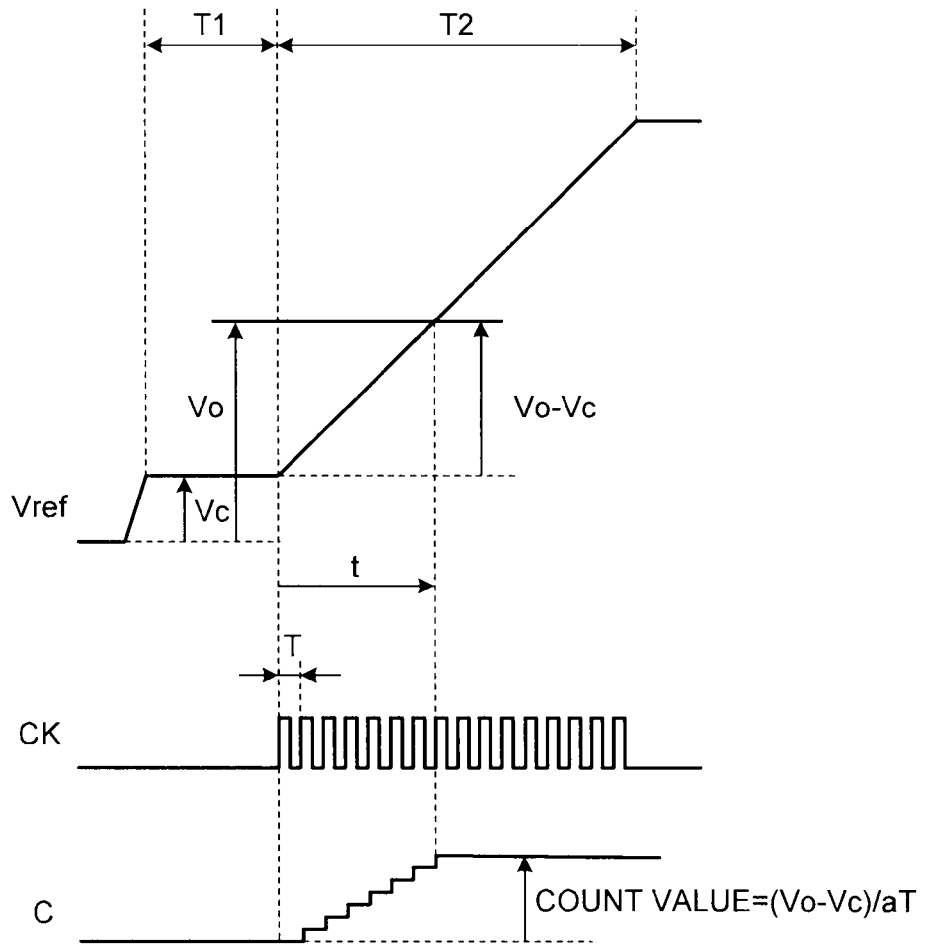
FIG. 4 is a timing chart illustrating an AD conversion operation of a pixel signal performed by a column AD conversion (ADC) circuit in FIG. 1.

FIG. 4 is a timing chart illustrating an AD conversion operation of a pixel signal performed by the column ADC circuit of FIG. 1.

In FIG. 4, the reference voltage Vref is time-divisionally switched between a clamping voltage generation period T1 and a ramp wave generation period T2. The reference voltage Vref is maintained at the clamping voltage Vc during the clamping voltage generation period T1. The ramp wave is given as the reference voltage Vref, and the counter clock CK is input during the ramp wave generation period T2. The inclination of the ramp wave at this time can be given by $dV/dt=a$.

When the pixel voltage of the image signal S1 read from the effective pixel portion 1a is defined as Vo, the signal component Vp obtained through the AD conversion operation can be given by Vo−Vc. The counter clock CK is counted until the level of the pixel voltage Vo read from the effective pixel portion 1a is matched with the level of the ramp wave, so that a count value C at that time is output as the AD converted value of the signal component, Vp=Vo−Vc. When the cycle of the counter clock CK is defined as T, the count value C at that time can be given by $(Vo-Vc)/(aT)$.

Figure 5:
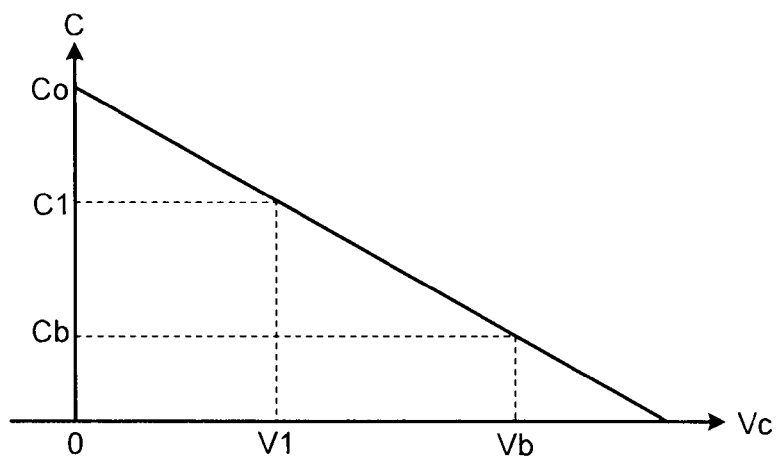
FIG. 5 is a diagram illustrating an example of a method of calculating a clamping voltage of the solid-state imaging device of FIG. 1.

FIG. 5 is a diagram illustrating an example of a method of calculating a clamping voltage of the solid-state imaging device of FIG. 1. This example shows a method of calculating the clamping voltage Vb for the target value Cb of the black level by acquiring count values C0 and C1 at the time when two points (0 and V1) are given as the clamping voltages Vc, and by interpolating the clamping voltages Vc at that time.

Specifically, when a voltage change amount of a ramp wave voltage for each unit time is defined as a and the pixel voltage to undergo the AD conversion operation is defined as Vo, a time t taken while the ramp wave voltage is generated and then matched with the pixel voltage Vo to undergo the AD conversion operation is given by the following expression (1) based on the relation of $at=Vo$.

$$t=Vo/a \quad (1)$$

When the counter, that measures the time t, increments one count for one cycle T, the count value C is given by the following expression (2) based on the expression (1).

$$C=t/T=Vo/aT \quad (2)$$

Here, the clamping voltage Vc can be added or subtracted in advance before the ramp wave is generated. At this time, the signal voltage Vp to undergo the AD conversion operation becomes a voltage (Vo−Vc), obtained by subtracting the clamping voltage Vc from the pixel voltage Vo. For this reason, the count value C which is the result of the A/D conversion operation of the signal voltage Vp is given by the following expression (3) and represented by a linear function of the clamping voltage Vc.

$$C=Vo/aT=(Vo-Vc)/aT=(-1/aT)Vc+(1/aT)Vo \quad (3)$$

Here, when, of the pixel voltage Vo, a signal voltage due to incident light is defined as Vi and a signal voltage due to a pixel dark voltage or an offset voltage of a circuit is defined as Vn, the signal voltage Vo is given by the following expression (4).

$$Vo=Vi+Vn \quad (4)$$

In the light-shielded pixel, since Vi=0, the relation "Vo=Vn" is established from the expression (4). Therefore, the count value C is given by the following expression (5) based on the expression (3).

$$C=(-1/aT)Vc+(1/aT)Vn \quad (5)$$

Hereafter, variables in the expression (5) is put as follows.

$$\alpha=-1/aT$$

$$\beta=(1/aT)Vn$$

Here, two kinds of values, 0 and Vc1, are given as the value of the clamping voltage Vc. The count value C0 for Vc=0 is given by the following expression (6) based on the expression (5).

$$Co=\beta \quad (6)$$

The count value C1 for Vc=V1 becomes $C1=\alpha V1+\beta$ based on the expression (5), and is given by the following expression (7).

$$\alpha=(C1-Co)/V1 \quad (7)$$

Here, since the relation "Cb=((C1−Co)/Vc)Vb+Co" is established based on the expression (5), the expression (6), and the expression (7), the clamping voltage Vb to cause the AD converted value of the light-shielded pixel to become the target value Cb of the black level is given by the following expression (8).

$$Vb=V1\cdot(Cb-Co)/(C1-Co) \quad (8)$$

Therefore, the clamping voltage, by which the desired black level data output is given, can be determined by operating the AD converted values at the two kinds of clamping voltages on the basis of the expression (8), without using a feedback system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an effective pixel portion provided with effective pixels;
a light-shielded pixel portion provided with light-shielded pixels;
an ADC (Analog to Digital Conversion) circuit that performs an AD (Analog to Digital) conversion operation on signal components read from the effective pixel and the light-shielded pixel on the basis of a result of a comparison with a reference voltage on which a clamping voltage is superimposed; and an AD clamping circuit that calculates a clamping voltage for a target value of a black level read from the light-shielded pixel by extrapolating a relation between the clamping voltage and an AD converted value of the black level read from the light-shielded pixel when the clamping voltage is applied, wherein the AD clamping circuit gives a relation between the clamping voltage and the AD converted value of the black level read from the light-shielded pixel as a linear function, and wherein the AD clamping circuit gives clamping voltages of two or more points as the predetermined clamping voltage.

2. The solid-state imaging device according to claim 1, wherein the reference voltage is time-divisionally switched between a clamping voltage generation period and a ramp wave generation period.

3. The solid-state imaging device according to claim 2, wherein the signal component is AD-converted on the basis of a result of a count of a clock until a level of the signal component is matched with a level of a ramp wave during the ramp wave generation period.

4. The solid-state imaging device according to claim 1, wherein the effective pixels are arranged in a matrix form in a direction of row and a direction of column.

5. The solid-state imaging device according to claim 4, further comprising:
 a vertical shift register that scans the effective pixel portion and the light-shielded pixel portion in a vertical direction; and
 a horizontal shift register that scans the effective pixel portion and the light-shielded pixel portion in a horizontal direction.

6. The solid-state imaging device according to claim 5, further comprising:
 a reference voltage generating unit that generates the reference voltage on the basis of a control parameter.

7. The solid-state imaging device according to claim 6, wherein the AD clamping circuit sets the control parameter such that a dark current of the light-shielded pixel is offset by a clamping level of the reference voltage when the ADC circuit performs the AD conversion operation.

8. The solid-state imaging device according to claim 1, further comprising an OB (Optical Black) clamping circuit that clamps an image signal read from the effective pixel on the basis of the black level read from the light-shielded pixel.

9. The solid-state imaging device according to claim 8, further comprising a gain adjusting circuit that adjusts a white balance and a gain of the image signal output from the OB clamping circuit.

10. The solid-state imaging device according to claim 9, further comprising a color separating circuit that converts the image signal output from the gain adjusting circuit into a color separation signal.

11. The solid-state imaging device according to claim 10, further comprising an automatic level controlling circuit that adjusts a brightness of a screen on the basis of a brightness signal output from the color separation signal.

12. The solid-state imaging device according to claim 11, wherein the automatic level controlling circuit adjusts a digital gain and an analog gain on the basis of the brightness signal, the digital gain is output to the gain adjusting circuit, and the analog gain is output to the AD clamping circuit.

13. The solid-state imaging device according to claim 12, wherein the AD clamping circuit includes:
 a timing signal generating unit that switches between the clamping voltage generation period and the ramp wave generation period;
 a pixel average value calculating unit that generates, during the clamping voltage generation period, a first HOB (Horizontal Optical Black) pixel average value obtained by averaging, for each horizontal line, the black levels read from the light-shielded pixels when a first clamping voltage is applied, and a second HOB pixel average value obtained by averaging, for each horizontal line, the black levels read from the light-shielded pixels when a second clamping voltage is applied;
 a first light-shielded pixel average value holding register that holds the first HOB pixel average value;
 a second light-shielded pixel average value holding register that holds the second HOB pixel average value;
 a clamping voltage control value operating unit that calculates a clamping voltage control value for the target value of the black level, on the basis of the first HOB pixel average value and the second HOB pixel average value; and
 an A/D conversion controller that sets the control parameter such that a clamping voltage for the target value of the black level is applied, on the basis of the clamping voltage control value.

14. The solid-state imaging device according to claim 13, wherein the clamping voltage control value operating unit calculates the clamping voltage control value by interpolating a relation between the first and second clamping voltages and the first and second HOB pixel average values.

15. The solid-state imaging device according to claim 14, wherein the reference voltage is held at the clamping voltage during the clamping voltage generation period, and a ramp wave is given as the reference voltage during the ramp wave generation period.

16. The solid-state imaging device according to claim 15, wherein the control parameter is set such that an inclination of the ramp wave is controlled according to the analog gain during the ramp wave generation period.

17. The solid-state imaging device according to claim 16, wherein when the clamping voltage is defined as Vc and a pixel voltage of an image signal read from the effective pixel portion is defined as Vo, a signal component that is AD-converted by the ADC circuit is given by Vo - Vc.

18. The solid-state imaging device according to claim 17, when a counter clock is counted until a level of a pixel voltage read from the effective pixel portion is matched with a level of the ramp wave, and a count value at that time is output as an AD-converted value of the signal component, and when a cycle of the counter clock is defined as T and an inclination of the ramp wave is defined as a, the count value is given by (Vo - Vc) /(aT).

* * * * *